United States Patent
Nakashio et al.

(10) Patent No.: US 12,363,244 B2
(45) Date of Patent: Jul. 15, 2025

(54) INFORMATION PROCESSING APPARATUS AND CONTROL METHOD FOR COLOR VERIFICATION

(71) Applicant: CANON KABUSHIKI KAISHA, Tokyo (JP)

(72) Inventors: Hidekazu Nakashio, Saitama (JP); Yukihiro Shindo, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/170,434

(22) Filed: Feb. 16, 2023

(65) Prior Publication Data
US 2023/0269343 A1   Aug. 24, 2023

(30) Foreign Application Priority Data
Feb. 24, 2022  (JP) .................. 2022-026375

(51) Int. Cl.
*H04N 1/60* (2006.01)
*G06F 3/12* (2006.01)
*H04N 1/32* (2006.01)

(52) U.S. Cl.
CPC ......... *H04N 1/6033* (2013.01); *G06F 3/1208* (2013.01); *G06F 3/121* (2013.01); *G06F 3/1237* (2013.01); *H04N 1/32133* (2013.01); *H04N 2201/3269* (2013.01)

(58) Field of Classification Search
USPC ....................................................... 358/1.9
See application file for complete search history.

(56) References Cited

U.S. PATENT DOCUMENTS

| | | | |
|---|---|---|---|
| 6,459,425 B1* | 10/2002 | Holub | G01J 3/0291 348/253 |
| 2016/0014284 A1* | 1/2016 | Ko | G06F 21/36 726/19 |
| 2016/0209819 A1* | 7/2016 | Cudak | G05B 15/02 |
| 2016/0301830 A1* | 10/2016 | Shibata | H04N 1/00323 |
| 2019/0260910 A1* | 8/2019 | Maeda | H04N 1/6052 |
| 2019/0260911 A1* | 8/2019 | Toriyabe | G06T 11/001 |
| 2020/0064196 A1* | 2/2020 | Inada | H04N 1/6055 |
| 2021/0090694 A1* | 3/2021 | Colley | G16H 15/00 |

(Continued)

FOREIGN PATENT DOCUMENTS

| | | |
|---|---|---|
| EP | 3667428 A1 | 6/2020 |
| JP | 2020030754 A | 2/2020 |

OTHER PUBLICATIONS

Anonymous, "Removable Media Job Setup for Document Copier", Kenneth Mason Publications, vol. 312, No. 11, Oct. 1, 1990, eleven pages.

(Continued)

*Primary Examiner* — Darryl V Dottin
(74) *Attorney, Agent, or Firm* — Canon U.S.A., Inc. I.P. Division

(57) ABSTRACT

An information processing apparatus includes a color measurement unit configured to perform color measurement on a color chart on which a job identifier is printed by a printing apparatus, and a verification processing unit configured to perform color verification on an image printed by the printing apparatus corresponding to the job identifier, based on a color measurement value measured by the color measurement unit, and the job identifier.

16 Claims, 12 Drawing Sheets

(56) References Cited

U.S. PATENT DOCUMENTS

2021/0294552 A1* 9/2021 Fujita .................... G06F 3/1288
2022/0230725 A1* 7/2022 Utz ........................ H05B 47/11

OTHER PUBLICATIONS

Wencheng Wu, et al., "Optimal Patch Code Design Via Device Characterization", Image Quality and System Performance IX, Proc. of SPIE-IS&T Electronic Imaging, SPIE, vol. 8293, Jan. 22, 2012, nine pages.

* cited by examiner

FIG.6A

MAIN MENU

601 — REGISTER COLOR VERIFICATION SPECIFICATION
602 — VERIFY COLOR

YES | NO

FIG.6B

COLOR VERIFICATION SPECIFICATION REGISTRATION

603 — COLOR VERIFICATION SPECIFICATION 1
604 — COLOR VERIFICATION SPECIFICATION 2
605 — UNREGISTERED
606 — UNREGISTERED

YES | NO

FIG.6C

COLOR VERIFICATION SPECIFICATION DETAIL SELECTION

607 — SELECT CHART
608 — SELECT PRINTER
609 — SELECT MEASURING DEVICE
610 — INPUT ALLOWABLE VALUE

YES | NO

FIG.6D

CHART SELECTION

611 — CHART 1
612 — CHART 2
613 — UNREGISTERED
614 — UNREGISTERED
615 — INPUT CHART

YES | NO

FIG.6E

PRINTER SELECTION

616 — PRINTER 1
617 — PRINTER 2
618 — PRINTER 3

YES | NO

FIG.6F

MEASURING DEVICE SELECTION

619 — MEASURING DEVICE 1
620 — MEASURING DEVICE 2
621 — MEASURING DEVICE 3

YES | NO

FIG.6G

ALLOWABLE VALUE INPUT

· COLOR DIFFERENCE ALLOWABLE VALUE

| | | |
|---|---|---|
| 622 | AVERAGE VALUE | 4.0 |
| 623 | MAXIMUM VALUE | 10.0 |
| 624 | PRIMARY COLOR | 5.0 |

YES    NO

FIG.6H

COLOR VERIFICATION SPECIFICATION SELECTION

| | |
|---|---|
| 625 | COLOR VERIFICATION SPECIFICATION 1 |
| 626 | COLOR VERIFICATION SPECIFICATION 2 |

YES    NO

FIG.6I

REPORT RESULT

| | | | |
|---|---|---|---|
| 825 | AVERAGE VALUE | 2.91 | OK |
| 826 | MAXIMUM VALUE | 9.00 | OK |
| 827 | PRIMARY COLOR (C) | 1.02 | OK |
| 828 | PRIMARY COLOR (M) | 1.3 | OK |
| 829 | PRIMARY COLOR (Y) | 2.4 | OK |
| 830 | PRIMARY COLOR (K) | 3.4 | OK |

YES    NO

FIG.6J

CHART MEASUREMENT

SET PRINTED CHARTS ON THE MEASURING DEVICE 1.

YES    NO

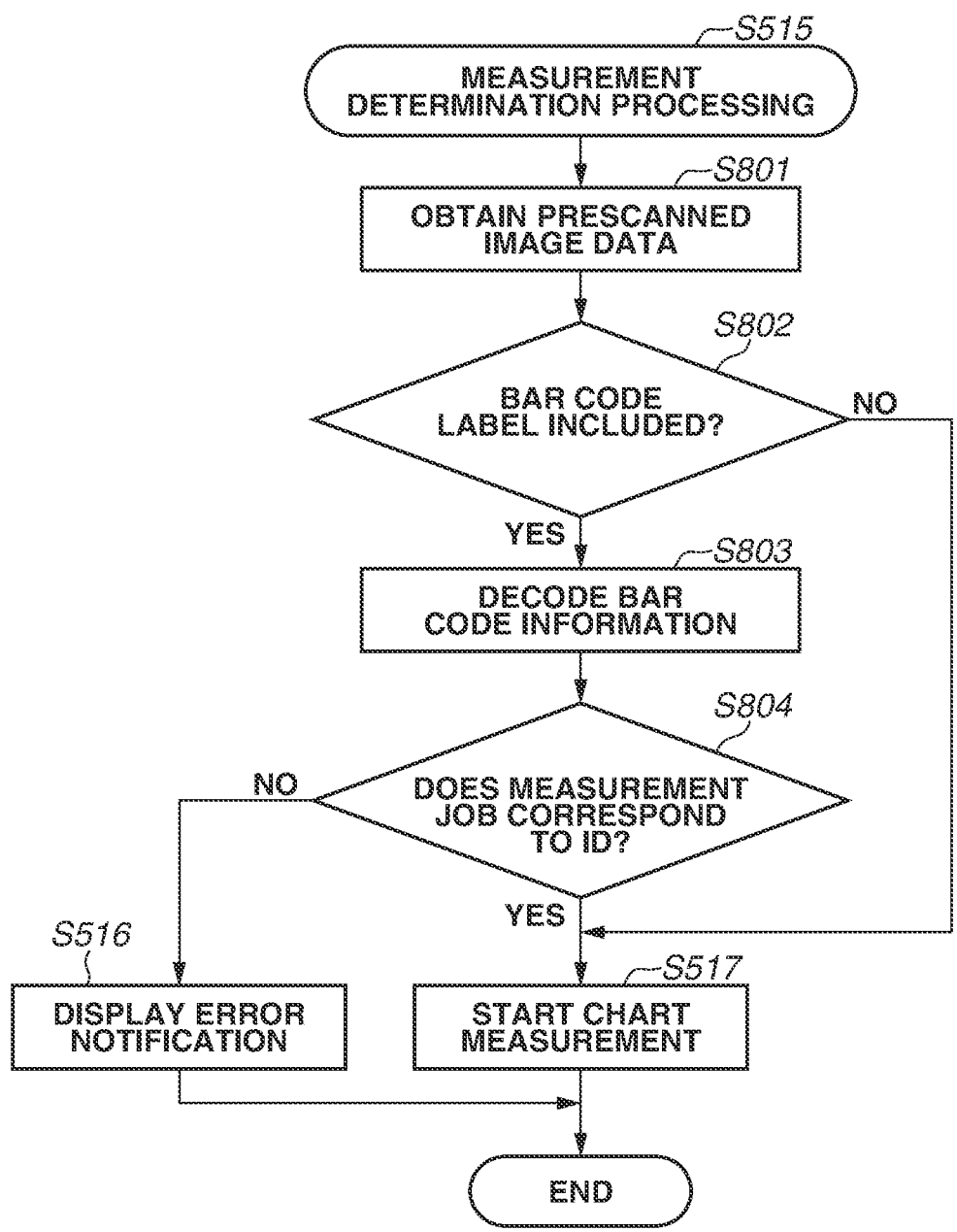

INFORMATION PROCESSING APPARATUS AND CONTROL METHOD FOR COLOR VERIFICATION

BACKGROUND

Field

The present disclosure generally relates to information processing and, more particularly, to an information processing apparatus and a method for controlling the information processing apparatus for color verification.

Description of the Related Art

In general, in commercial color printers, color management is performed on a regular basis to secure a predetermined color reproducibility. The color management is performed by comparing a target color defined by a standard such as International Organization for Standardization (ISO) standards and a color (printed color) actually printed by a printer, and checking whether the color precision satisfies an acceptance criterion. In a case where the color precision does not satisfy the acceptance criterion, to improve the color precision, regeneration of a print profile and correction processing using a color correction function of the printer are necessary, which takes time and labor. Thus, these operations should be performed efficiently. Japanese Patent Application Laid-open No. 2020-30754 discusses a technique of performing verification of the color precision (color verification) of a printer at a plurality of timings during printing, determining a correction operation execution period based on the verification results, and displaying a history of the verification results.

To obtain a printed color in a color verification, a chart in which color patches each corresponding to a target color are arranged is printed using a printer, and color values corresponding to the respective color patches are measured using a measuring device. Further, in a case where a plurality of colors is verified at a time, a plurality of charts is printed by a printer and the plurality of charts is set on a measuring device and measured. At this time, if the plurality of different charts is set and measured by the measuring device in random order, there is a possibility that a color verification may be performed using an inappropriate chart. Japanese Patent Application Laid-open No. 2020-30754 discusses no processing regarding the foregoing possibility. Accordingly, to prevent the color verification from being performed using an inappropriate chart, it is necessary to measure the chart immediately after being printed according to the technique discussed in Japanese Patent Application Laid-open No. 2020-30754. Therefore, with the technique discussed in Japanese Patent Application Laid-open No. 2020-30754, printing and a color measurement need to be repeated for each time when a color verification is performed, and the color measurement operation needs to be divided, which can cause inconvenience for users.

SUMMARY

The present disclosure is directed to an information processing apparatus and control method that improves color verification performance.

According to some embodiments, an information processing apparatus includes a color measurement unit configured to perform color measurement on a color chart on which a job identifier is printed by a printing apparatus, and a verification processing unit configured to perform color verification on an image printed by the printing apparatus corresponding to the job identifier, based on a color measurement value measured by the color measurement unit, and the job identifier.

Further features of the present disclosure will become apparent from the following description of exemplary embodiments with reference to the attached drawings.

BRIEF DESCRIPTION OF THE DRAWINGS

FIGS. 6A to 6J are diagrams each illustrating an example of a screen of a display unit according to the first exemplary embodiment.

FIG. 8 is a flowchart illustrating a flow of color measurement determination processing according to the first exemplary embodiment.

DESCRIPTION OF THE EMBODIMENTS

Various exemplary embodiments, features, and aspects of the present disclosure will be described with reference to the drawings that may have different characteristics, advantages, disadvantages, performance parameters, or the like. Note that the exemplary embodiments described below are not intended to limit the disclosure related to the scope of the claims, and not all of the combinations of features described in the exemplary embodiments are essential for solving the issues in the present disclosure.

System Configuration

Figure 1:
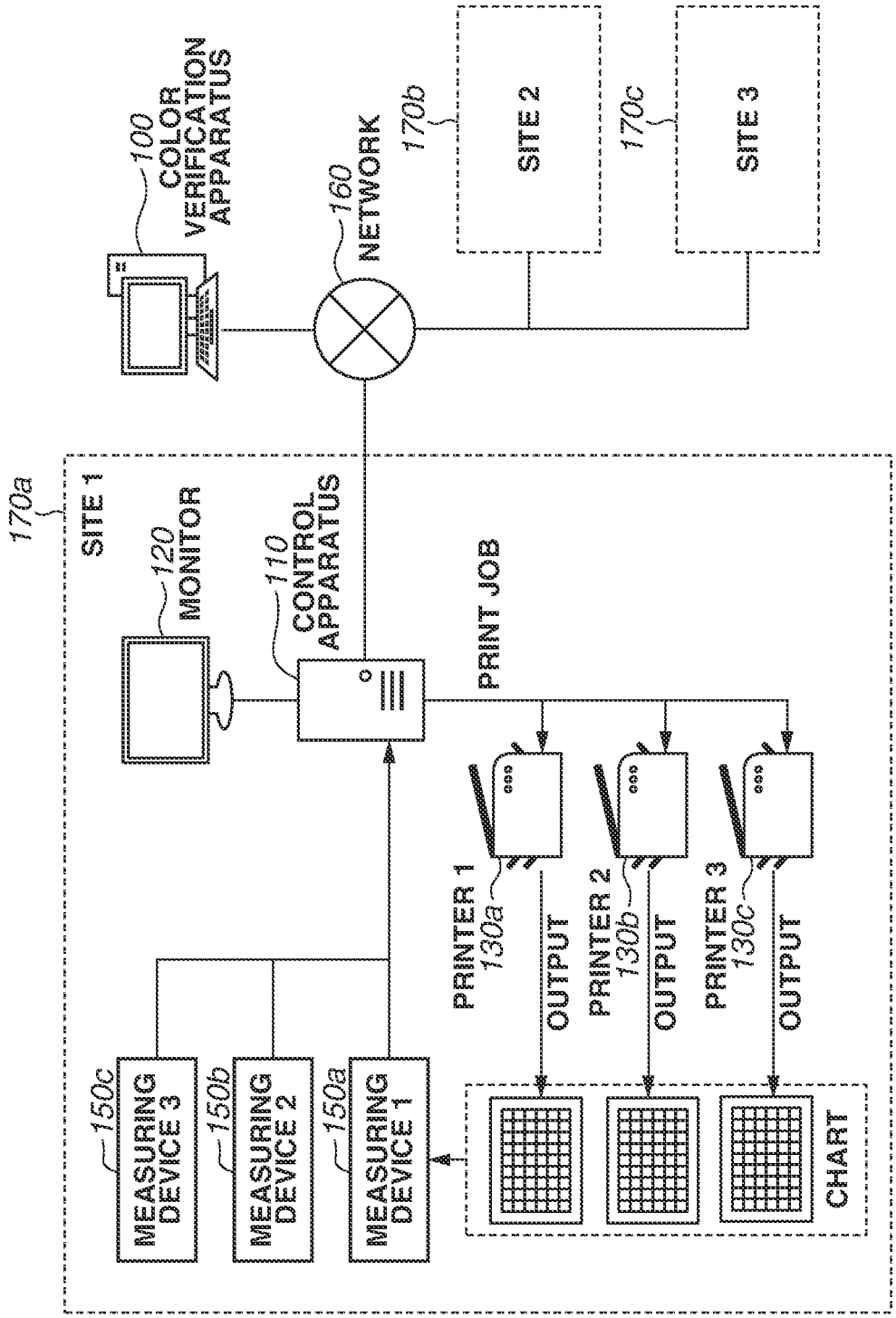
FIG. 1 is a diagram schematically illustrating an overall configuration of a color verification system.

FIG. 1 is a diagram schematically illustrating an overall configuration of a color verification system according to a first exemplary embodiment. To perform a color precision verification, first, a predetermined chart is printed out from a target printer. Next, a color measurement of color patches on the printed chart is performed, and the obtained colorimetric data is transmitted to a color verification apparatus 100. Then, the color verification apparatus 100 checks a difference between a printed color and a target color (color precision). In addition, color patches arranged on the chart are also referred to as a color chart or a color sample, and are simply referred to as "patches" in this specification.

In the color verification system illustrated in FIG. 1, the color verification apparatus 100 and sites 1 to 3 (170a to 170c) are connected via a network 160. The site 1 includes a control apparatus 110, a monitor 120, printers 1 to 3 (130a to 130c), and measuring devices 1 to 3 (150a to 150c). Further, each of the site 2 and the site 3 also includes a control apparatus, a monitor, printers, and measuring devices. Hereinbelow, a relationship between the site 1 and the color verification apparatus 100 will be described as an example.

The color verification apparatus 100 compares a color serving as a target color defined in advance (target color) and a color actually printed by a printer (printed color), to verify whether the color precision of the printed color satisfies an acceptance criterion. The color verification apparatus 100 is connected to the control apparatus 110 via the network 160 to be communicable with each other.

The control apparatus 110 is connected to the printers 130a to 130c in the site 1 via a communication network such as an intranet to be communicable with each other, and issues a print instruction to each printer and centrally manages the color precision of each printer. Further, regarding the print instruction, for example, the control apparatus 110 can divide a print job received from a client terminal (not illustrated) into predetermined units (e.g., units of copies or units of pages) so that separate print instructions for one print job are issued dispersedly to a plurality of printers. A print job includes a page description language (PDL) data portion for describing, on a page unit basis, a rendering command for an object with an attribute such as a text, a graphic, and a picture, and print setting information for designating a sheet size and a sheet type, and print conditions such as a double-sided/single-sided printing. By issuing print instructions for one print job dispersedly to a plurality of printers, a printing time and a print waiting time can be reduced.

The monitor 120 is connected to the control apparatus 110, and displays various kinds of user interface (UI) screens.

Each of the printers 1 to 3 (130a to 130c) prints a color image on a sheet based on a print job from the control apparatus 110 using, for example, an electrophotographic process technique. Each of the printers 1 to 3 may be a monochrome printer or a printer using another image forming technique, such as an ink-jet printer. Further, each of the printers 1 to 3 may be a multifunction peripheral having a copy function or a facsimile (FAX) function in addition to the print function.

Figure 2:
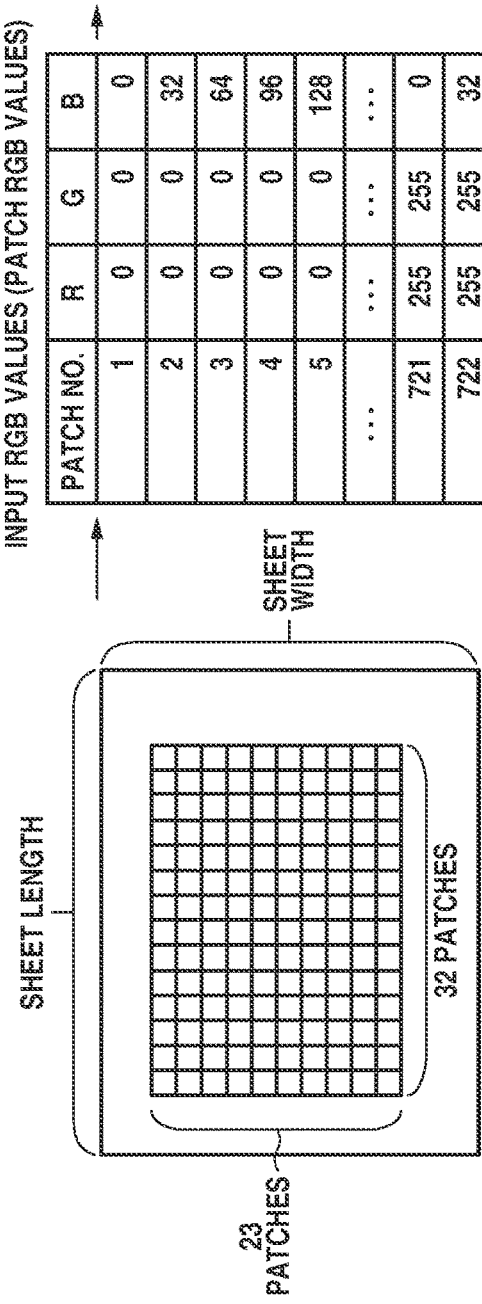
FIGS. 2A, 2B, and 2C are diagrams illustrating examples of patch signal values and color characteristics of a color verification chart.

Each of the measuring devices 1 to 3 (150a to 150c) is a spectrophotometric measuring device for measuring a color value of a target object based on a reflectance ratio or a transmission ratio of visible light with a wavelength of about 400 nm to 700 nm. The measuring devices 1 to 3 are prepared for each of the sites 1 to 3 to obtain colorimetric data by converting the wavelengths obtained for patches of charts printed out by the printers 1 to 3 into values in, for example, an L*a*b* color space or an XYZ color space. FIG. 2A is an example of the chart, and FIG. 2B illustrates target color values (RGB values) for the patches (patch numbers 1 to 729) of the chart defined in the RGB color space. Each of the measuring devices 1 to 3 is a measuring device including a line sensor or an area sensor for scanning the chart. For example, if the measuring device is an automatic document reading type measuring device using a sheet-through method, the measuring device can measure the color after detecting a position of each patch to be measured by pre-scanning the chart using a built-in line sensor. Further, if the measuring device can automatically feed sheets and perform continuous measuring, the measuring device can measure the color of each patch in a similar manner after detecting the position of each patch by pre-scanning the chart with a built-in area sensor. A portable (hand-held) type measuring device can also be used, but in this case, a scanner for scanning the chart additionally needs to be connected to the control apparatus 110. In the case of the automatic document reading type measuring device of the sheet-through type, the measuring device is connected to the control apparatus 110 via, for example, a universal serial bus (USB), and measures a color value of each patch on the chart printed out from a target printer to obtain colorimetric data illustrated in FIG. 2C. The obtained colorimetric data is transmitted to the color verification apparatus 100 via the control apparatus 110. Further, in a case where the color verification apparatus 100 is installed in one of the sites 1 to 3, the color verification apparatus 100 and the measuring device may be connected directly, so that the color verification apparatus 100 can obtain the colorimetric data from the measuring device without the control apparatus 110.

The network 160 is, for example, a local area network (LAN), the Internet, or an intranet, and may be a wireless or wired network.

Each of the sites 1 to 3 (170a to 170c) corresponds to a location of a printing company where the printers are installed. For example, the site 1 is a printing site in Tokyo, the site 2 is a printing site in Osaka, and the site 3 is a printing site in Fukuoka.

In addition, the configuration of the color verification system illustrated in FIG. 1 is just an example, and the number of sites or the configuration of each apparatus in each of the sites can be changed as appropriate. For example, the color verification apparatus 100 may be directly connected to the control apparatus 110 or to the measuring devices 1 to 3 via a communication network such as an intranet to manage color precision of each of the plurality of printers 1 to 3. Further, for example, an information processing apparatus including both functions of the color verification apparatus 100 and the control apparatus 110 may be provided in each site, and the information processing apparatus may manage the color precision of the plurality of printers in the site.

Color Verification Apparatus/Hardware Configuration of Control Apparatus

Figure 3:
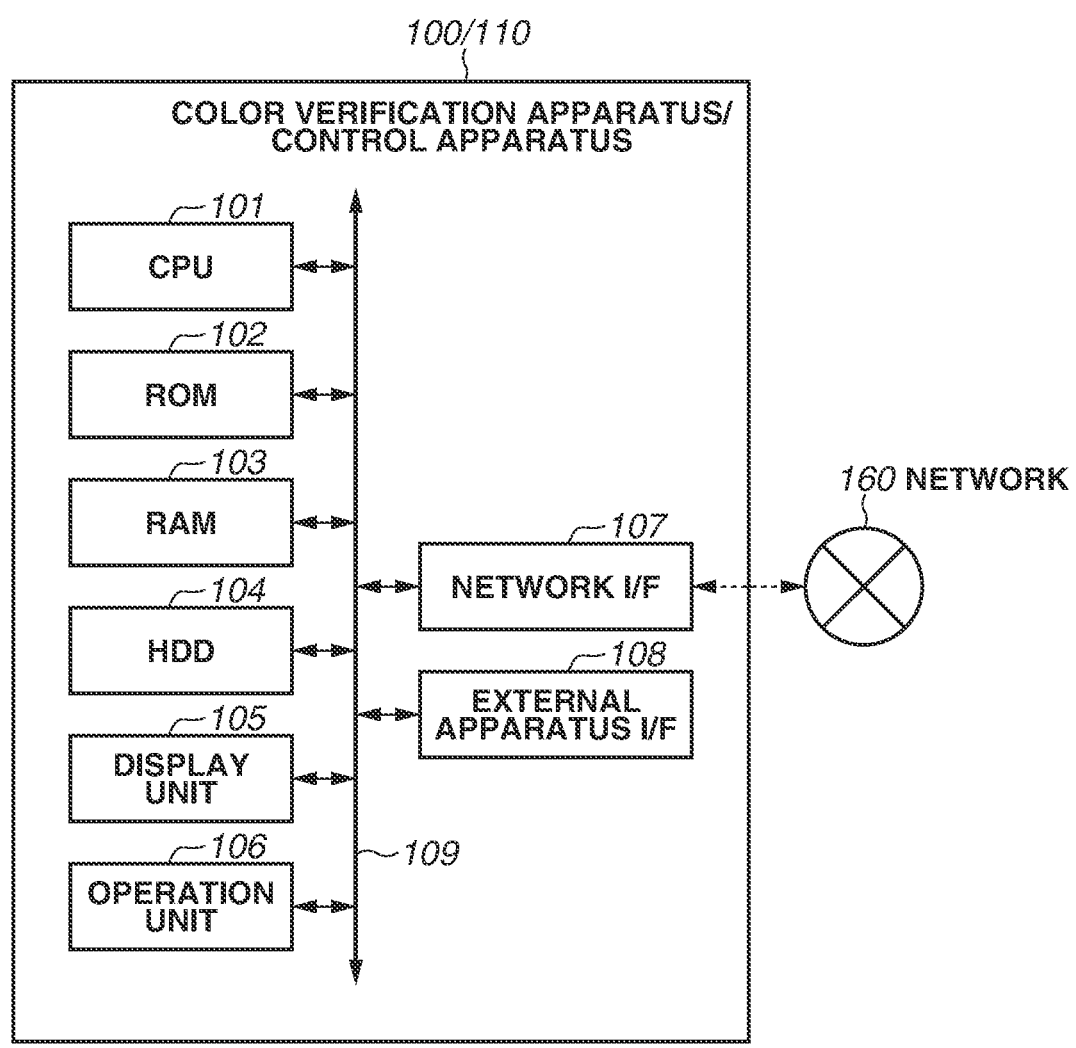
FIG. 3 is a block diagram illustrating a hardware configuration of a color verification apparatus and a control apparatus.

Each of the color verification apparatus 100 and the control apparatus 110 described above is an information processing apparatus and, for example, implemented by a general-purpose notebook-size personal computer, a desktop personal computer, or a tablet terminal. FIG. 3 is a block diagram illustrating a hardware configuration of the color verification apparatus 100 and the control apparatus 110, and each of the color verification apparatus 100 and the control apparatus 110 includes a central processing unit (CPU) 101, a read-only memory (ROM) 102, a random access memory (RAM) 103, a hard disk drive (HDD) 104, a display unit 105, an operation unit 106, a network interface (I/F) 107, and an external apparatus I/F 108. The components 101 to 108 illustrated in FIG. 3 are connected to each other via a system bus 109. As used here, the term "unit" generally refers to any combination of hardware, firmware, software, or other component that is used to effectuate a purpose.

The CPU 101, which includes one or more processors, circuitry, or combinations thereof, is an arithmetic processing unit for controlling the entire apparatus and performs image processing to be described below, based on a program stored in the ROM 102. The ROM 102 is a read only memory storing, for example, a boot program, a processing program, character data, and character code information. The RAM 103 is a random access memory used as a work memory when the CPU 101 executes various programs. Further, the RAM 103 is used as a data storage area for storing image files received via the network I/F 107. The HDD 104 is used for storing, for example, results of the arithmetic processing executed by the CPU 101, various kinds of programs, and various kinds of information files.

The display unit 105 is configured of, for example, a liquid crystal display and displays a user interface screen for making various settings or checking an apparatus state. The operation unit 106 is configured of a keyboard or buttons and used by a user to input or reset various kinds of setting values. The network I/F 107 is an interface for connecting the apparatus to the network 160. The color verification apparatus 100 and the control apparatus 110 can exchange various kinds of information with external apparatuses via the network I/F 107.

The external apparatus I/F 108 is an interface for connecting to the external apparatuses such as the measuring devices 1 to 3 via a communication bus, for example, a USB bus.

Software Configuration of Color Verification Apparatus

Figure 4:
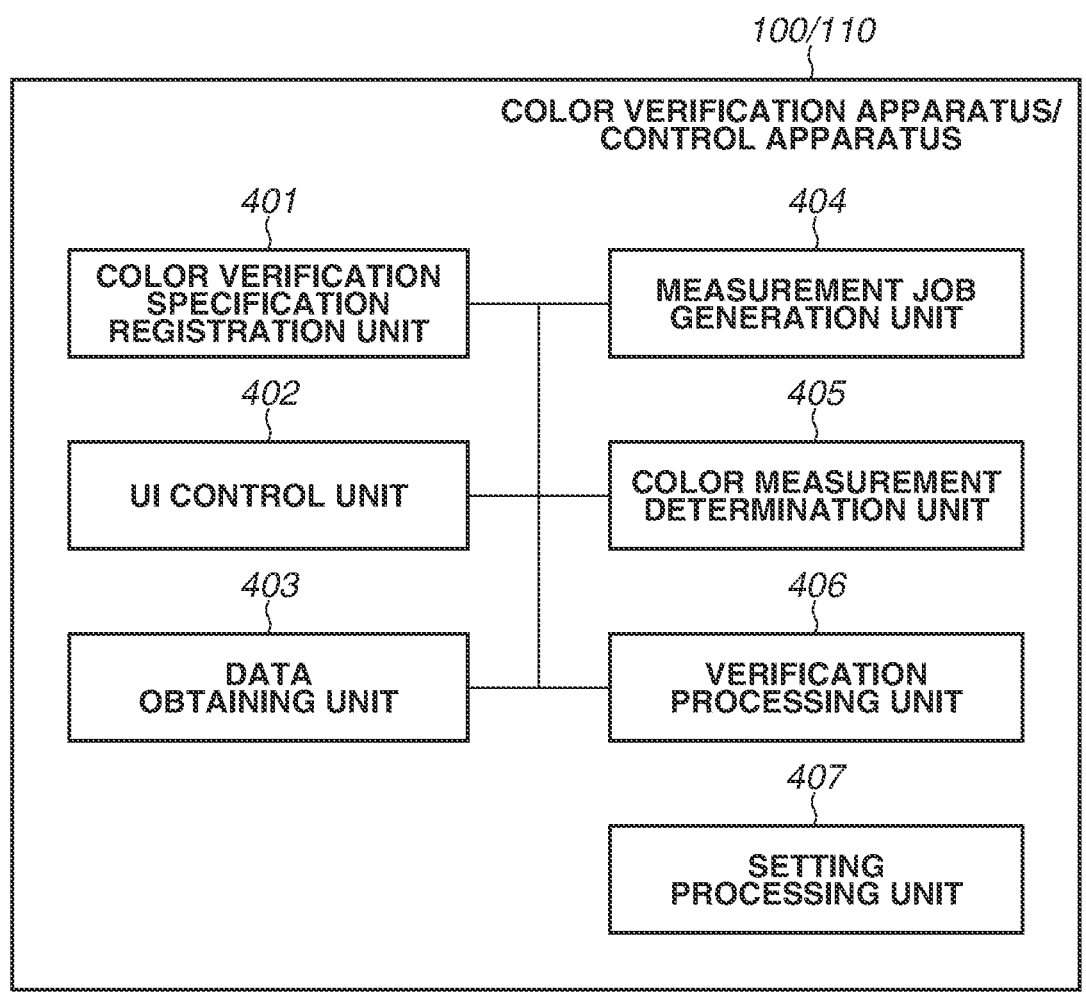
FIG. 4 is a block diagram illustrating a main functional configuration of the color verification apparatus.

Next, a software configuration of the color verification apparatus 100 and the control apparatus 110 will be described. FIG. 4 is a block diagram illustrating a main functional configuration of the color verification apparatus 100 and the control apparatus 110 according to the present exemplary embodiment. Each of the color verification apparatus 100 and the control apparatus 110 includes a color verification specification registration unit 401, a UI control unit 402, a data obtaining unit 403, a measurement job generation unit 404, a color measurement determination unit 405, a verification processing unit 406, and a setting processing unit 407. These functional units are implemented by the CPU 101 executing a predetermined program. Hereinbelow, each functional unit will be described.

The color verification specification registration unit 401 registers, for each type of color verification, a chart on which patches of various colors corresponding to target color values are arranged, a printer to be subjected to the color verification, a measuring device used for color verification, and an allowable value set for the color verification. More specifically, the chart to be registered is stored in the HDD 104 in a state where information about the chart indicating a chart configuration such as the number of patches and the sizes of the patches in the chart (chart configuration information) is associated with the image data. The charts are roughly classified into a predefined chart defined according to a standard such as International Standard Organization (ISO) standards, and a custom chart uniquely defined by a user. The predefined chart is stored in advance, for example, when a color verification program is installed. The custom chart is registered at any timing based on the user's input via the operation unit 106. The printer to be subjected to the color verification is registered from among the printers 130a, 130b, and 130c connected to the control apparatus 110. The measuring device to be used for the color verification is registered from among the measuring devices 150a, 150b, and 150c. The allowable value at a time of the color verification is a value used when a color to be a target (target color) determined based on a standard such as ISO standards, and a color (printed color) actually printed by the printer are compared to check whether the color precision satisfies the acceptance criterion. For example, in a case where the determination is performed based on a difference (color difference) between the color value (target value) of the target color and the color value (measured value) of the printed color, a color difference value is registered as an allowable value, and if the color difference value is the allowable value or less, the color precision is determined to satisfy the acceptance criterion. Further, when the color verification is performed, a user selects a color verification specification from among the color verification specifications registered with the color verification specification registration unit 401, and the measurement job generation unit 404 generates a measurement job. Then, the color verification is started.

The UI control unit 402 performs control to display a user interface screen for a user to check a state of each apparatus in the color verification system, to input or select various setting values, and to issue a start instruction for each of various kinds of processing. The user interface screen to be displayed will be described below.

The data obtaining unit 403 obtains various kinds of information and data used by the color measurement determination unit 405 or the verification processing unit 406, to be described below.

The user selects a plurality of color verification specifications used for the color verifications from among the verification specifications registered by the user with the color verification specification registration unit 401, and the measurement job generation unit 404 generates measurement jobs.

In a case where a plurality of charts respectively corresponding to a plurality of measurement jobs is output, the color measurement determination unit 405 determines whether each of the measurement target charts corresponds to one of the measurement jobs. In the present exemplary embodiment, a bar code with a measurement job identifier (ID) embedded therein is provided to the chart, and the color measurement determination unit 405 determines whether the measurement target chart is a chart corresponding to the measurement job based on the bar code information.

The verification processing unit 406 performs verification processing to determine whether the color precision of the target printer satisfies the acceptance criterion using the colorimetric data received from the measuring device.

The setting processing unit 407 performs settings of various parameters relating to the verification processing based on the user's selection or the like via a predetermined user interface screen.

Flow of Processing in Overall System

Figure 5:
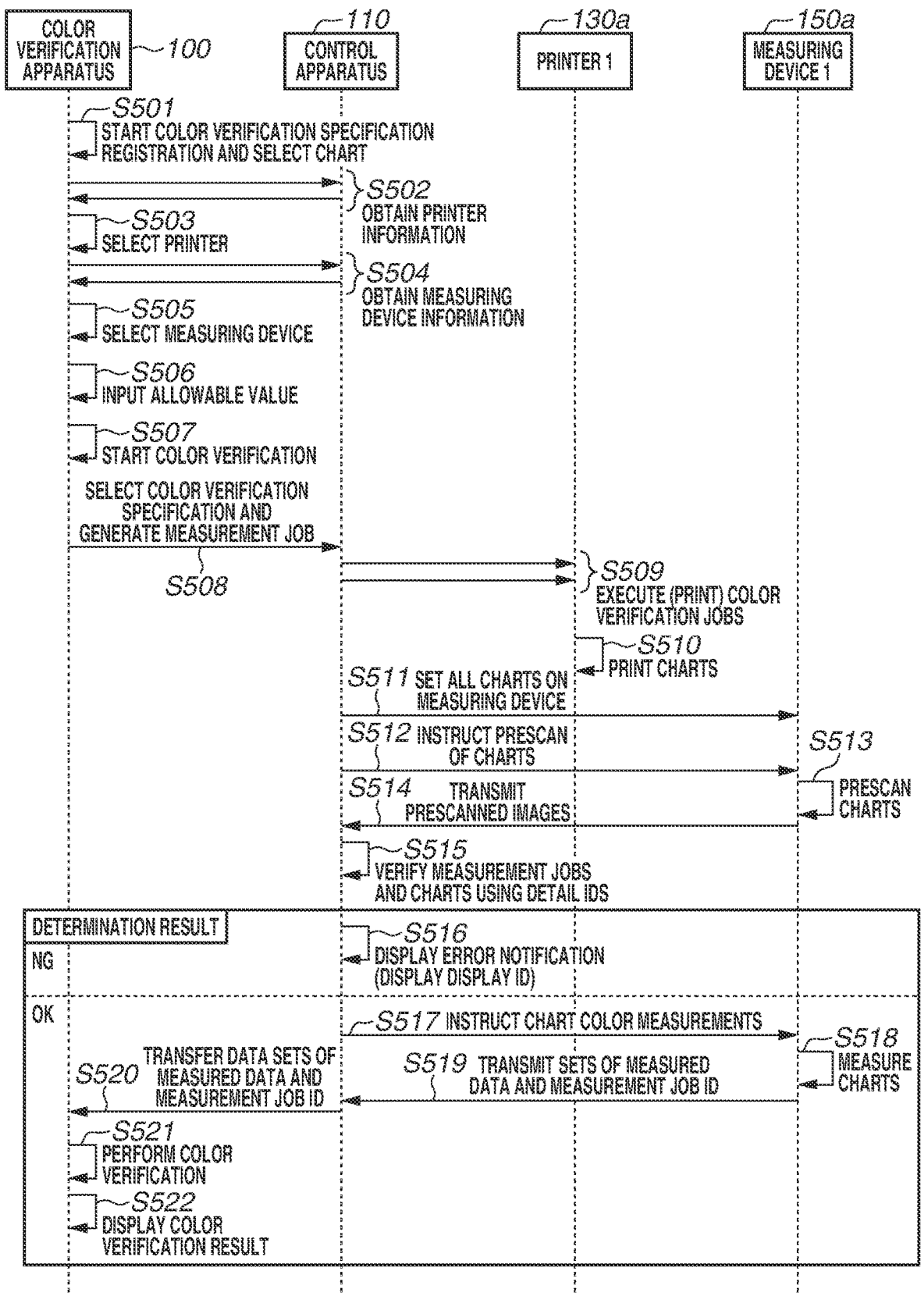
FIG. 5 is a sequence diagram illustrating a flow of processing in a color verification system according to a first exemplary embodiment.

FIG. 5 is a sequence diagram illustrating a flow of processing in the color verification system according to the present exemplary embodiment. Hereinbelow, the flow of processing in the overall verification system will be described with reference to the sequence diagram illustrated in FIG. 5 using, as an example, a case where a plurality of color verifications for the printer 1 is performed using the measuring device 1 by outputting a plurality of charts. In the following description, the symbol "S" means a step.

In step S501, the color verification specification registration unit 401 starts a color verification specification registration, based on a user's input. When a user who desires to register the color verification specification presses a color verification specification registration button 601 on a main menu screen illustrated in FIG. 6A, the screen shifts to a color verification specification registration screen illustrated in FIG. 6B. These UI screens are controlled by the UI control unit 402.

In display areas 603 to 606 in the color verification specification registration screen illustrated in FIG. 6B, when a color verification specification to be registered or edited is pressed, the screen shifts to a color verification specification detail selection screen illustrated in FIG. 6C.

Next, when "select chart" in a display area 607 is pressed on the color verification specification detail selection screen in FIG. 6C, the screen shifts to a chart selection screen illustrated in FIG. 6D. The user selects a chart to be used for the color verification from among display areas 611 to 614 on the chart selection screen illustrated in FIG. 6D. Each of "chart 1" in the display area 611 and "chart 2" in the display area 612 on the chart selection screen in FIG. 6D is a preregistered predefined chart defined by a standard such as ISO standards. When the user presses a chart input button 615, then, the user inputs various kinds of information for registering a custom chart. More specifically, the user inputs a name of the custom chart to be registered, the number of patches, patch sizes, a sheet size/type, and then uploads image data. In this way, the registration is completed. The chart image is generated in a file format such as Tag Image File Format (TIFF), Portable Document Format (PDF), and Joint Photographic Experts Group (JPEG) format. In this way, the chart is registered in a display area 613 or 614 indicative of "unregistered" of the chart selection screen in FIG. 6D. Hereinbelow, a registered chart list and chart configuration information for each chart are collectively referred to as "chart information".

In step S502, the data obtaining unit 403 obtains a list of the printers 1 to 3 managed by the control apparatus 110, and information indicating a status of each printer (hereinbelow, referred to as "printer status information"). In this case, the printer status information includes information about, for example, a power status (ON/OFF), presence or absence of a malfunction, and a processing status (printing/standby) of a print job. The control apparatus 110 periodically accesses each of the printers 1 to 3 to obtain the printer status information and hold the information therein. Hereinbelow, the printer list and the printer status information for each printer are collectively referred to as "printer information".

In step S503, the color verification specification registration unit 401 receives a press of "select printer" in a display area 608 on the color verification specification detail selection screen in FIG. 6C. Then, the screen shifts to a printer selection screen in FIG. 6E, and processing for receiving selection of a printer to be a target of the color verification (hereinbelow, referred to as a "target printer") is performed. More specifically, the UI control unit 402 receives a user's selection via the UI screen displayed on the display unit 105, and the setting processing unit 407 sets the selected printer (printer 1 in this case) as the target printer. FIG. 6E illustrates a printer selection screen used when the user selects a target printer. In display areas 616 to 618 on the printer selection screen, printers that can be processing targets (printers 1 to 3 in this case) are listed and displayed according to the printer information obtained in step S502. At this time, display processing of, for example, greying out the printers in a print disabled condition is performed based on the printer status information so that it is recognizable whether each printer is in a print enabled condition or a print disabled condition. On the printer selection screen in FIG. 6E, only the printer 2 is grayed out to indicate that the printer 2 is in a print disabled condition.

In step S504, the data obtaining unit 403 obtains a list of the measuring devices 1 to 3 managed by the control apparatus 110, and specification information of each measuring device, and information indicating a status of each measuring device (hereinbelow, referred to as "measuring device status information"). At this time, the specification information is information indicating the specification of each measuring device, such as a processable sheet size, a processable minimum patch size, and the minimum/maximum number of patches for one sheet (one page). If the measuring device has an accessory added thereto, the specification information includes information about a specification difference depending on whether the accessory is attached to the measuring device. In this case, the accessory means a measurement ruler, an automatic sheet feeding unit, or the like. The measurement ruler is a device for assisting a hand-held type measuring device in a slide operation at a time of measurement to enable a stable color measurement. A sensor mounted on the back side of the measuring device detects a stripe pattern of the measurement ruler to enable detection of a measurement direction (left to right, or right to left) in which the user is performing the measurement. The automatic sheet feeding unit is a device that automatically takes charts printed by and output from the printer into the measuring device to enable a continuous color measurement. The measuring device status information includes information such as a power status (ON/OFF) and a connection status. The control apparatus 110 preliminarily or periodically accesses the measuring devices 1 to 3 to obtain the specification information and the measuring device status information, and holds the pieces of information therein. The measuring device list, and the specification information and the measuring device status information for each measuring device are collectively referred to as "measuring device information".

In step S505, the color verification specification registration unit 401 receives a press of "select measuring device" in a display area 609 on the color verification specification detail selection screen in FIG. 6C. Then, the screen shifts to a measuring device selection screen illustrated in FIG. 6F, and processing for receiving selection of a measuring device used for measuring a chart color value is performed. More specifically, the UI control unit 402 receives a user's selection via the UI screen displayed on the display unit 105, and the setting processing unit 407 sets the selected measuring device as a measuring device used for the chart measurement. FIG. 6F illustrates the measuring device selection screen used by the user to select a measuring device. In display areas 619 to 621 on the measuring device selection screen, measuring devices that can be a processing target (measuring devices 1 to 3) are listed according to the measuring device information obtained in step S504. At this time, display processing of, for example, greying out the measuring device in an unusable condition is performed based on the measuring device status information so that it is recognizable whether the measuring device is in a usable condition or an unusable condition. On the measuring device selection screen in FIG. 6F, only the measuring device 2 is greyed out to indicate that the measuring device 2 is in an unusable condition.

In step S506, the color verification specification registration unit 401 receives a press of "input allowable value" in a display area 610 on the color verification specification detail selection screen in FIG. 6C. Then, the screen shifts to an allowable value input screen illustrated in FIG. 6G, and processing for accepting data such as a target color value for each patch in the used chart, and an allowable value for each verification item is performed. More specifically, the UI control unit 402 receives user's inputs via the UI screen displayed on the display unit 105, and the setting processing unit 407 sets the input target color value and the input allowable value for each verification item. FIG. 6G illustrates the allowable value input screen used by the user to input the allowable values of the verification items. As the verification items, for example, an average value of color differences ΔE for each patch, a maximum value of the color differences ΔE, and color differences ΔE in the primary colors (CMYK) are used, and the allowable values for the verification items are set. FIG. 6G illustrates the allowable value input screen for setting an allowable value corresponding to each verification item. The user sets the allowable value corresponding to each verification item in advance via such a UI screen. In the present exemplary embodiment, the color difference ΔE is a rectilinear distance between a target color value and a color value (color measurement value) indicated by the measured data in an L*a*b* color space, and can be obtained using, for example, the following equation (1).

$$\Delta_E = \sqrt{\Delta L^2 + \Delta a^2 + \Delta b^2}$$

$$\Delta L = L_1 - L_2$$

$$\Delta a = a_1 - a_2$$

$$\Delta b = b_1 - b_2 \qquad (1)$$

Assume that an allowable value of a color difference for each verification item is set as displayed on the allowable value input screen in FIG. 6G. In this case, if the average value of the color differences ΔE for each patch is within ±4.0, the maximum value of the color differences ΔE is within ±10.0, and the color differences ΔE of the primary colors (CMYK) are within ±5.0, the color verification is determined as "passed" (OK). If any of the verification items exceeds the allowable value, the color verification is determined as "failed" (NG).

In step S507, the measurement job generation unit 404 starts the color verification, based on a user's input. When a user who desires to start the color verification presses a color verification button 602 on the main menu screen illustrated in FIG. 6A, the screen shifts to a color verification specification selection screen illustrated in FIG. 6H. These UI screens are controlled by the UI control unit 402.

In step S508, if the user presses either of "color verification specification 1" in a display area 625 and "color verification specification 2" in a display area 626 on the color verification specification selection screen in FIG. 6H, the measurement job generation unit 404 performs processing of generating a measurement job corresponding to the selected color verification specification. In addition, it is possible to generate a plurality of measurement jobs by selecting a plurality of color verification specifications at a time. When a measurement job is generated, the target printer of the color verification, the measuring device to be used, and the chart and the allowable values used for the color verification, which are registered in the processing in steps S501 to S506, are uniquely determined.

In this step, a measurement job ID (job identifier) is assigned to the image data of the chart.

Figure 9A:
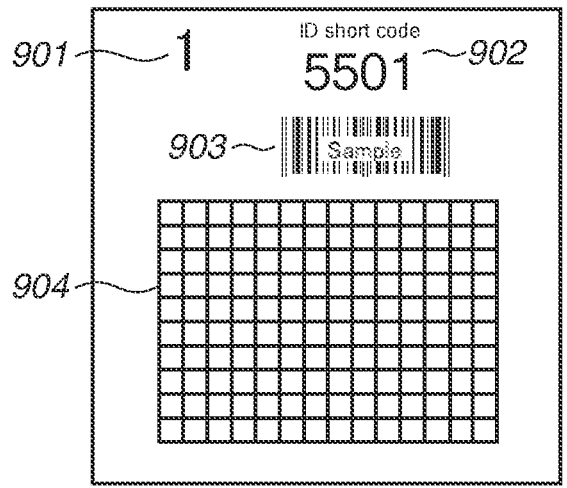
FIGS. 9A, 9B, and 9C are diagrams each illustrating a color verification chart according to the first embodiment.

A chart illustrated in FIG. 9A is a color chart with a measurement job ID assigned thereto. A page number 901 indicates a page number of the color chart, and in a case where the color chart used for the color verification consists of a plurality of pages, the page number 901 is counted up. A display ID 902 is a display ID for a measurement job ID, and an ID code associated with each measurement job is assigned thereto. Checking the display ID enables the user to recognize the color chart associated with the measurement job. A detail ID 903 is an ID for details of the measurement job ID and used in measurement determination processing performed in step S515 (described below) to automatically determine which measurement job the chart corresponds to. The detail ID 903 is an example of a detail ID for the case of a one-dimensional bar code that is a one-dimensional code. Table 1 illustrates a format example of the one-dimensional bar code. The one-dimensional bar code includes chart layout information in the first to the eighth digits, and in a case of a number "RRCCXXYY", the "RR" indicates the number of rows, the "CC" indicates the number of columns, the "XX" indicates a patch size in the horizontal direction, and the "YY" indicates a patch size in the vertical direction. Next, the number in the 9th digit indicates a chart page number, and the numbers in the 11th to 46th digits indicate numbers associated with the measurement job ID. The numbers in the 48th to 51st digits indicate a check sum, which is used to distinguish the bar code from other bar codes in order to prevent tampering. Table 1 illustrates the numbers corresponding to the respective digits in the regular expression.

TABLE 1

| Digit | Content | Format (Regular Expression) |
|---|---|---|
| 1-8 | Chart Layout Information | [0-9A-F] |
| 9 | Page Number | [0-9] |
| 10 | Blank | Blank |
| 11-46 | Measurement Job ID Number | [0-9A-F]{8}\-[0-9A-F]{4}\-[0-9A-F]{4}\-[0-9A-F] {4}\-[0-9A-F]{12} |
| 47 | Blank | \* |
| 48-51 | Check Sum | \d{4} |

There is a case where a plurality of copies of a chart is printed for one measurement job to perform a color verification. This is, for example, a case where the color verification is desired to be performed with a stable printing density after printing a plurality of copies because the density tends to fluctuate at the time when the printer starts printing. For example, if a user wants to print three copies of the same chart and perform the color verification using the second copy without using the first and second copies, there may be an issue where it is difficult to distinguish which copy of the chart it is even by referring to the measurement job ID described in Table 1 because the same measurement job ID is assigned to the all three copies of the chart, which is an issue. To address this issue, as illustrated in Table 2, a measurement job ID including copy number information may be assigned to each copy of the chart to enable the user to determine which printed copy of the chart it is. Using the measurement job ID in the Table 2 enables the measured value of the second copy of the chart to be sent to the color verification apparatus 100.

TABLE 2

| Digit | Content | Format (Regular Expression) |
|---|---|---|
| 1-8 | Chart Layout Information | [0-9A-F] |
| 9 | Copy Number | [0-9] |
| 10 | Page Number | [0-9] |
| 11 | Blank | Blank |
| 12-47 | Measurement Job ID Number | [0-9A-F]{8}\-[0-9A-F]{4}\-[0-9A-F]{4}\-[0-9A-F] {4}\-[0-9A-F]{12} |
| 48 | Blank | \* |
| 49-52 | Check Sum | \d{4} |

Color patches 904 are arranged on a chart, and the color verification is performed by performing the color measurement of the patches.

Figure 9B:
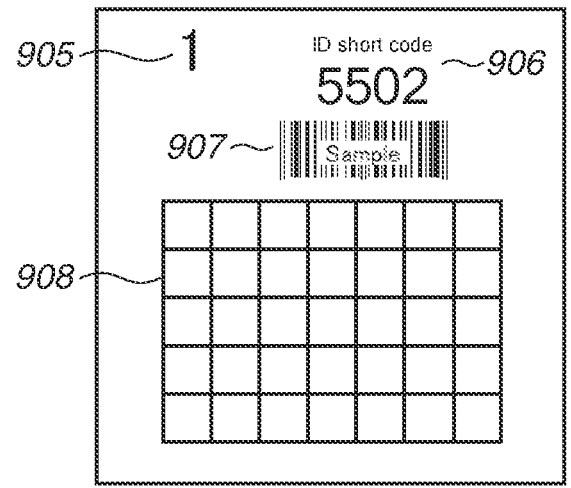

The charts with different numbers assigned thereto as the measurement job IDs illustrated in FIGS. 9A and 9B are used when a plurality of color verifications is performed. The display IDs 902 and 906 are display IDs of the measurement job IDs, and ID codes associated with the respective measurement jobs are assigned thereto, so that display IDs 902 and 906 are assigned the different display IDs. Checking the display ID enables the user to recognize by which of the printer 1 and the printer 2 the chart is printed out. In a similar manner, the detail IDs 903 and 907 are detail IDs of the measurement IDs, and are assigned different ID codes associated with the respective measurement jobs. Thus, the detail IDs 903 and 907 are different. The color patches 904 and the color patches 908 consist of patches based on different signal values.

Figure 9C:
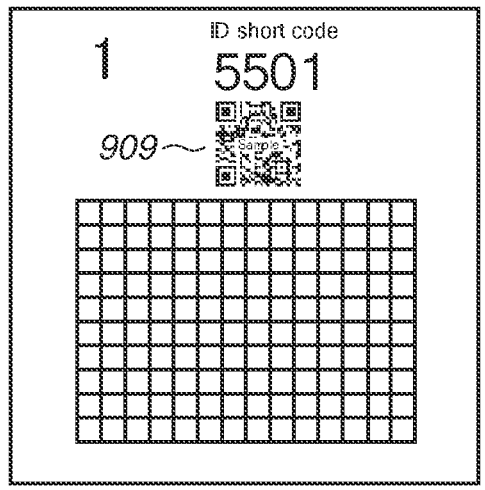

A detail ID 909 in FIG. 9C, similar to the detail ID 903, is an ID for details to be used in measurement determination processing in step S515 described below. The detail ID 909 is an example of a detail ID in the form of a QR Code® that is a two-dimensional code. Whether to assign the bar code (see detail ID 903) or to assign the QR code (see detail ID 905) as a detail ID to the chart may be switched depending on a sensor of the measuring device. More specifically, if the sensor built in the measuring device used to pre-scan the chart is a line sensor (liner sensor) in which a plurality of elements is arranged in a row, the sensor can only a bar code. In this case, a bar code is assigned to the chart. On the other hand, if the sensor built in the measuring device is an area sensor in which a plurality of elements is arranged two-dimensionally in horizontal and vertical directions, a QR code is assigned to the chart because more information can be embedded in a QR code than a bar code. A chart with the measurement job IDs (two types of IDs: display ID and detail ID) assigned thereto is provided to the target printer. In the case of the present exemplary embodiment, first, the image data of the determined chart is transmitted to the control apparatus 110 via the network I/F 107.

In step S509, the control apparatus 110 transmits the print jobs for the plurality of charts to the target printer, based on the received image data.

In step S510, the target printer that has received the print jobs performs print processing to output the plurality of charts based on the print jobs.

In step S511, the control apparatus 110 performs processing to prompt the user to perform color measurement of the plurality of charts printed out from the target printer. More specifically, the control apparatus 110 displays a chart measurement screen (guidance screen) as illustrated in FIG. 6J to prompt the user to set the plurality of printed out charts on the measuring device.

In step S512, the control apparatus 110 instructs the selected measuring device (measuring device 1 in this case) to pre-scan the plurality of charts printed out from the target printer. In step S513, the selected measuring device performs pre-scanning of the plurality of charts.

In step S514, the selected measuring device transmits pieces of image data corresponding to the plurality of charts obtained by the pre-scanning to the control apparatus 110.

In step S515, upon receiving the pre-scanned images, the color measurement determination unit 405 performs processing to determine whether the measurement target charts set on the measuring device in step S511 are the charts corresponding to the measurement jobs generated in step S508. Details of this measurement determination processing will be described below.

Figure 7:
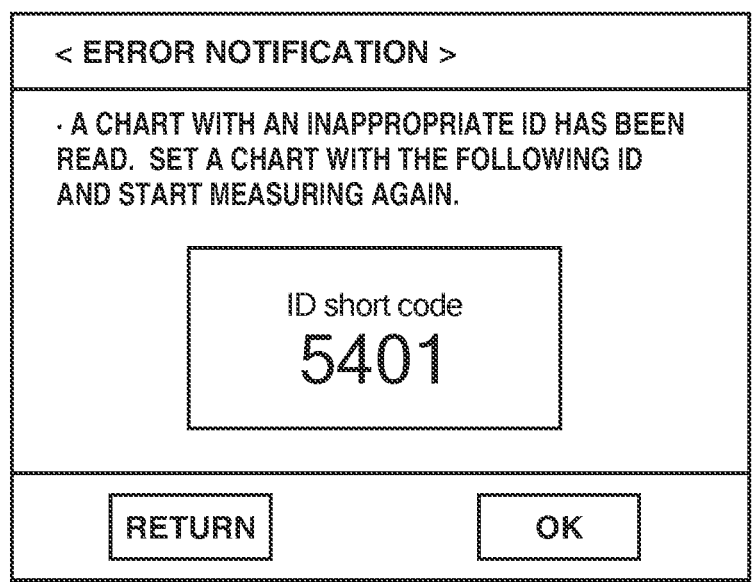
FIG. 7 is a diagram illustrating an example of an error notification on the display unit according to the first exemplary embodiment.

In step S516, the UI control unit 402 displays an error notification on the display unit 105. FIG. 7 illustrates an error notification screen that displays the error notification. In a case where the measurement target chart set on the measuring device has an ID different from any of the measurement job IDs of the measurement jobs generated in step S508, the UI control unit 402 displays a correct ID on the display unit 105 as illustrated in FIG. 7 to prompt the user to start a measurement again.

In step S517, the control apparatus 110 instructs to perform color measurement of the plurality of charts printed out from the target printer. In step S518, when the user sets the plurality of charts and issues an instruction to start measurement, the selected measuring device (measuring device 1 in this case) measures a color value of each patch on the chart.

In step S519, after completing the measurement, the selected measuring device stores sets of pieces of obtained colorimetric data and the measurement job IDs as data, and transmits the sets of data to the control apparatus 110. In step S520, the control apparatus 110 receives the sets of data each including the colorimetric data and the measurement job ID from the selected measuring device, and transfers the sets of data to the color verification apparatus 100.

In step S521, the verification processing unit 406 performs processing to verify the color precision of the printer associated with the corresponding measurement job ID using the sets of data. In a case where the data includes a plurality of measurement job IDs, the verification processing unit 406 performs color verification processing for each of the measurement job IDs.

In step S522, the UI control unit 402 displays a verification result on the display unit 105. FIG. 6I illustrates a report result screen displaying the verification result. As illustrated in in FIG. 6I, on the display unit 105, the result of "passed/failed" (OK/NG) for each verification item is displayed together with the average value of the color differences, the maximum value of the color differences, and the color differences for the respective primary colors (CMYK) for each patch. The user can understand the color variation state of the target printer by viewing the report result screen. Then, even in a case where the verification result is "failed" (NG), the color variation of the printer can be restrained within the allowable range by regenerating the print profile and performing a correction operation using the color correction function of the printer.

This is the overall flow of processing in the color verification system according to the present exemplary embodiment. In addition, together with the display for prompting the user to perform color measurement of the chart, the control apparatus 110 may issue a preparation instruction to the selected measuring device to execute calibration before starting the measurement.

Measurement Determination Processing

Next, the color measurement determination processing performed in step S515 will be described in detail with reference to a flowchart illustrated in FIG. 8. A series of the processing in the flowchart in FIG. 8 is implemented by the CPU 101 of the color verification apparatus 100 loading a corresponding program to the color measurement determination unit 405, and executing the program. In the following description, the symbol "S" means a step.

In step S801, the color measurement determination unit 405 obtains the pre-scanned image data transmitted from the selected measuring device in step S514.

In step S802, the color measurement determination unit 405 determines whether the image data obtained by pre-scanning the chart in step S801 includes a bar code. More specifically, the color measurement determination unit 405 performs binarization processing on the image data, performs labeling processing by sequentially scanning the image data, and detects an area between the black bars on the both right and left sides of the bar code (whole). Next, the color measurement determination unit 405 counts the number of white areas in the whole area, and if the number of white areas is a predetermined number, the color measurement determination unit 405 determines that the image data includes the bar code label (YES in step S802), and the processing proceeds to step S803. If the number of the white areas is not a predetermined number, the color measurement determination unit 405 determines that the image data includes no bar code label (NO in step S802), and the processing proceeds to step S517. The bar code determination method is not limited to the method according to the present exemplary embodiment, and a known technique can be used.

In step S803, the color measurement determination unit 405 determines a code system of the bar code in the area determined to be a bar code label in step S802, and obtains bar code data illustrated in Table 1 by decoding the bar code.

In step S804, the color measurement determination unit 405 determines whether the measurement job ID number corresponding to the 11th to 46th digits in the bar code data (see Table 1) obtained in step S803 coincides with any one of the plurality of measurement job IDs generated in step S508. If the color measurement determination unit 405 determines that the measurement job ID number coincides with any one of the plurality of measurement job IDs generated in step S508 (YES in step S804), the processing proceeds to step S517. On the other hand, if the color measurement determination unit 405 determines that the measurement job ID number does not coincide with any one of the plurality of measurement job IDs generated in step S508 (NO in step S804), the processing proceeds to step S516.

As described above, according to the present exemplary embodiment, in the case where the plurality of color verifications is performed on one printer at a time, the plurality of measurement jobs is generated at a time, and the plurality of printed charts is subjected to the color measurement all at a time. At this time, it is automatically determined which one of the measurement jobs each one of the plurality of charts corresponds to using the measurement job IDs, and the color verification is performed by applying the measurement value to the corresponding measurement job. In this way, since the color measurement operation can be performed on the plurality of color verifications on the same printer at a time, convenience for users is improved.

In the first exemplary embodiment, in the case where the plurality of color verifications is performed on one printer, the plurality of measurement jobs is generated at a time, and the plurality of printed charts is subjected to the color measurement all at a time. In this case, it is automatically determined which one of the measurement jobs each one of the plurality of charts corresponds to using the measurement job IDs, and the color verification is performed by applying the measurement value to the corresponding measurement job. However, there is a case where a plurality of color verifications is desired to be performed at a time on a plurality of different printers. In a second exemplary embodiment, focusing on this case, a description will be given of a configuration in which, in a case where a plurality of color verifications is performed at a time on a plurality of different printers, a color verification for each printer is performed by applying a color measurement value to a corresponding measurement job. A description of the basic configuration of the color verification system common to the first exemplary embodiment will be omitted.

A schematic diagram illustrating an entire configuration of the color verification system according to the second exemplary embodiment is similar to that of the first exemplary embodiment, and thus a description thereof is omitted. A block diagram illustrating a hardware configuration of the color verification apparatus 100 and the control apparatus 110 according to the second exemplary embodiment is similar to that according to the first exemplary embodiment, and thus a description thereof is omitted. A block diagram illustrating a main functional configuration of the color verification apparatus 100 and the control apparatus 110 according to the second exemplary embodiment is similar to that according to the first exemplary embodiment, and thus a description thereof is omitted.

Flow of Processing in Overall System

Figure 10:
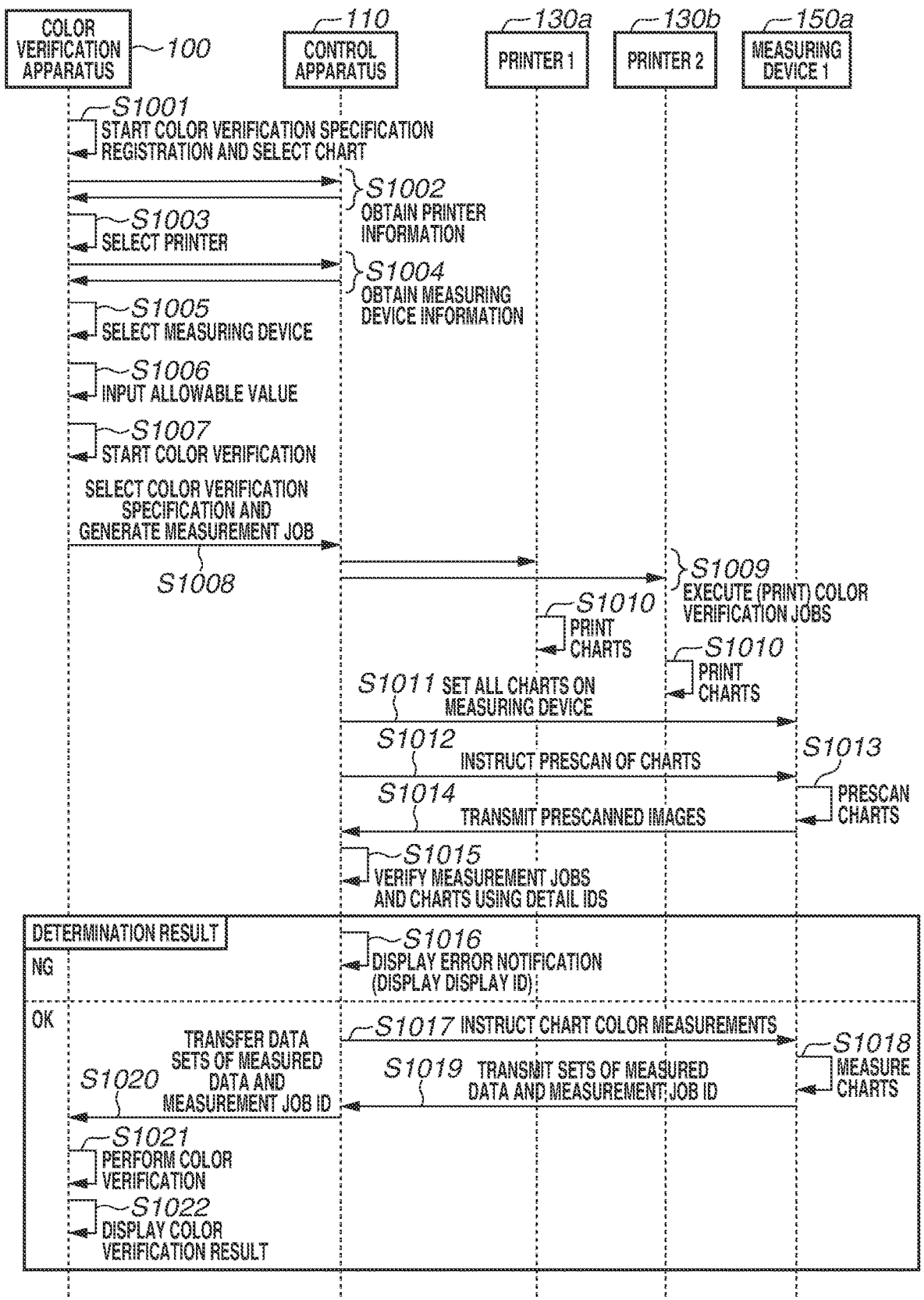
FIG. 10 is a sequence diagram illustrating a flow of processing in a color verification system according to a second exemplary embodiment.

FIG. 10 is a sequence diagram illustrating a flow of processing in the color verification system according to the present exemplary embodiment. Hereinbelow, a description will be given of a flow of processing in the entire color verification system according to the present exemplary embodiment centering on portions different from the first exemplary embodiment, with reference to the sequence diagram in FIG. 10.

Processing from the start of the color verification specification registration in step S1001 to the start of the color verification in S1007 is the same as the processing from the start of the color verification specification registration in step S501 to the start of the color verification in step S507 in the sequence diagram in FIG. 5 according to the first exemplary embodiment, and thus a description thereof is omitted.

Figure 11A:
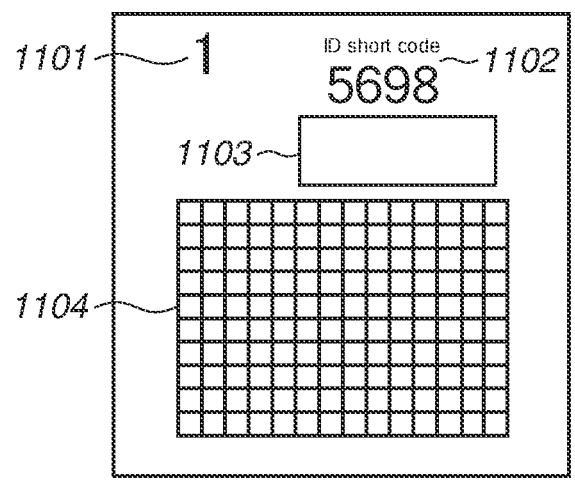
FIGS. 11A and 11B are diagrams each illustrating a color verification chart according to the second exemplary embodiment.
Figure 11B:
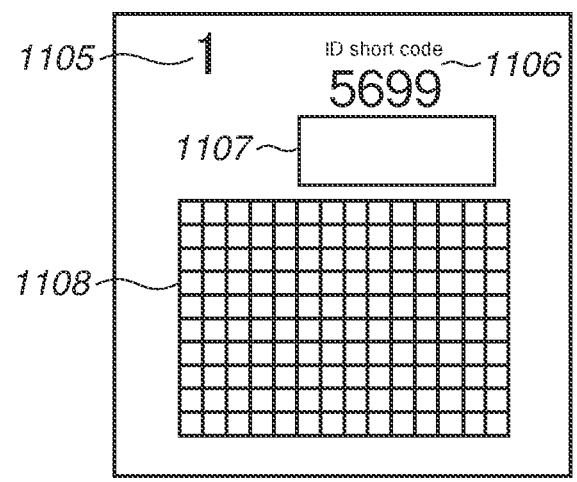

In step S1008, when a user presses either of "color verification specification 1" in the display area 625 and "color verification specification 2" in the display area 626 on the color verification specification selection screen in FIG. 6H, the measurement job generation unit 404 performs processing for generating a measurement job corresponding to each color verification specification. In addition, it is possible to generate a plurality of measurement jobs by selecting a plurality of color verification specifications at a time. When a measurement job is generated, printers each to be a target of the color verification, a measuring device to be used, and charts and allowable values used for the color verification, which are registered in the processing performed in steps S1001 to S1006, are uniquely determined. In the present exemplary embodiment, as illustrated in FIG. 10, a description will be given of an example of executing a plurality of the color verifications using the measuring device 1 by outputting a similar chart to each of a plurality of printers (printer 1 and printer 2). Even though the charts are similar, as illustrated in FIGS. 11A and 11B, different measurement job IDs are assigned to the respective charts. More specifically, a chart illustrated in FIG. 11A is output to the printer 1, and a chart illustrated in FIG. 11B is output to the printer 2. In FIGS. 11A and 11B, the same number is assigned to chart page numbers 1101 and 1105. Similarly, color patches 1104 and color patches 1108 are respectively formed based on the same signal values. On the other hand, display IDs 1102 and 1106 are display IDs of the measurement job IDs, and ID codes associated with the respective measurement jobs are assigned thereto, so that the display IDs 1102 and 1106 are different. Checking the display IDs enables the user to recognize by which of the printer 1 and the printer 2 the chart is printed out. In a similar manner, detail IDs 1103 and 1107 are detail IDs of the measurement IDs, and are assigned different ID codes associated with the respective measurement jobs. Thus, the detail IDs 1103 and 1107 are different. Then, the detail IDs are used when to automatically determine to which measurement job a chart corresponds (which printer has printed the chart) in measurement determination processing in step S1015 to be described below.

In step S1009, based on the received image data, the control apparatus 110 transmits the print job of the chart illustrated in FIG. 11A to the printer 1, and transmits the print job of the chart illustrated in FIG. 11B to the printer 2.

In step S1010, the printer 1 that has received the print job performs print processing based on the print job to output the chart illustrated in FIG. 11A. Similarly, the printer 2 that has received the print job performs print processing based on the print job to output the chart illustrated in FIG. 11B.

In step S1011, the control apparatus 110 performs processing to prompt the user to collectively perform color measurement on the plurality of charts printed out from the printer 1 and the printer 2 illustrated in FIGS. 11A and 11B. More specifically, the control apparatus 110 displays the chart measurement (guidance) screen as illustrated in FIG. 6J, to prompt the user to set the plurality of printed out charts on the measuring device.

In step S1012, the control apparatus 110 issues an instruction to the selected measuring device (measuring device 1 in this case) to pre-scan the plurality of charts output from the printer 1 and the printer 2 illustrated in FIGS. 11A and 11B.

In step S1013, the selected measuring device performs a pre-scan of the plurality of charts illustrated in FIGS. 11A and 11B.

In step S1014, after completing the pre-scan, the selected measuring device transmits the obtained pieces of image data from the plurality of charts illustrated in FIGS. 11A and 11B to the control apparatus 110.

In step S1015, upon receiving the pre-scanned images, the color measurement determination unit 405 performs processing to determine whether the measurement target charts set on the measuring device in step S1011 are the charts corresponding to the measurement jobs generated in step S1008. This measurement determination processing is similar to that performed in the first exemplary embodiment, and thus a description thereof will be omitted.

In step S1016, the UI control unit 402 displays an error notification on the display unit 105. In step S1017, the control apparatus 110 performs color measurement on the plurality of charts printed out from the printer 1 and the printer 2 illustrated in FIGS. 11A and 11B.

Processing from the chart measurement in step S1018 to the display of the color verification result in step S1022 is the same as that from step S518 to step S522 in FIG. 5 of the first exemplary embodiment, and thus descriptions thereof are omitted.

As described above, according to the present exemplary embodiment, in the case where a plurality of color verifications for a plurality of different printers is performed at the same time, a plurality of measurement jobs is generated at a time, and a plurality of printed charts printed by the different printers is collectively subjected to color measurement. At this time, it is automatically determined to which of the measurement jobs (i.e., to which of the printers) each one of the charts corresponds using measurement job IDs, and a color measurement value is applied to a corresponding measurement job to perform color verification. More specifically, as is described in step S1008, when the color verification is performed for each of the different printers, different detail IDs are assigned to the respective charts. Then, in the measurement determination processing performed in step S1015, it is automatically determined with which of the plurality of measurement job IDs the measurement job ID number corresponding to the 11th to 46th digits of the bar code data obtained from the chart coincides (i.e., from which printer the chart is output). In this way, a plurality of color verifications can be performed for different printers in one color measurement operation, thereby improving convenience for users.

According to the exemplary embodiments of the present disclosure, a plurality of color verifications can be performed at a time in one color measurement operation, and thus convenience for users can be improved.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors, circuitry, or combinations thereof (e.g., central processing unit (CPU), micro processing unit (MPU), or the like), and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2022-026375, filed Feb. 24, 2022, which is hereby incorporated by reference herein in its entirety.

What is claimed is:

1. An information processing system comprising:
   at least one processor and at least a memory coupled to the at least one processor and having instructions stored thereon, and when executed by the at least one processor, acting as:
   a verification job generation unit configured to generate a plurality of verification jobs all at once associated with an identifier for identifying a printing unit, the printing unit being configured to print a patch and the identifier on a chart based on the verification job;
   a reading unit configured to read the identifier and the chart; and
   a verification unit configured to verify printing by the printing unit that prints the chart based on the identifier and the chart read by the reading unit,
   wherein in a case where charts are printed by a plurality of different printing units, the verification job generation unit causes the plurality of different printing units to print different identifiers on the charts.

2. The information processing system according to claim 1, comprising:
   a management apparatus including the verification job generation unit and the verification unit;
   a printing apparatus including the printing unit; and
   a reading apparatus including the reading unit.

3. The information processing system according to claim 1, wherein the reading unit changes an identifier to be assigned according to a type of a sensor of the reading unit that reads the identifier.

4. The information processing system according to claim 1, wherein the verification job generation unit embeds layout information, a page number, a verification job ID, or a checksum, of the chart to which the identifier is assigned, in the identifier.

5. The information processing apparatus according to claim 4, wherein in a case where the verification job ID generated by the verification job generation unit and a verification job ID of the identifier assigned to the chart to be verified by the verification unit are different, the verification unit issues an error notification using the identifier.

6. The information processing system according to claim 1, wherein in a case where the printing unit prints a plurality of copies for one verification job, the verification job generation unit embeds information about a number of copies in the identifier.

7. The information processing system according to claim 1, wherein the identifier is a one-dimensional code or a two-dimensional code.

8. The information processing system according to claim 1, wherein the verification unit determines whether the chart is the chart corresponding to the verification job associated with the chart based on the identifier assigned to the chart, the reading unit starts reading in a case where the chart is the chart corresponding to the verification job, and the verification unit issues an error notification using the identifier with the identifier as the error notification in a case where the chart is not the chart corresponding to the verification job.

9. The information processing system according to claim 1, wherein the reading unit reads charts to which the plurality of identifiers is assigned all at once.

10. The information processing system according to claim 1, wherein the chart is a color chart.

11. The information processing system according to claim 1, wherein the verification job generation unit or the verification unit is on a same network as the printing unit or the reading unit.

12. A method for controlling an information processing system comprising at least one processor and at least a memory coupled to the at least one processor and having instructions stored thereon, and when executed by the at least one processor, acting as a verification job generation unit configured to generate a plurality of verification jobs all at once associated with an identifier for identifying a printing unit and to cause a plurality of different printing units to print different identifiers on charts in a case where the charts are printed by the plurality of different printing units, the printing unit being configured to print a patch and the identifier on a chart based on the verification job, a reading unit configured to read the identifier and the chart, and a verification unit configured to verify printing by the printing unit that prints the chart based on the identifier and the chart read by the reading unit, the method comprising:
   outputting an identifier and a verification job to a printing unit associated with the identifier, by the verification unit;
   inputting the identifier and the verification job by the printing unit;
   printing a chart to which the identifier is assigned based on the verification job, by the printing unit;
   reading the identifier and the chart, by the reading unit; and
   verifying the printing unit associated with the identifier based on the identifier and the chart read by the reading unit, by the verification unit.

13. An information processing system comprising:
   at least one processor and at least a memory coupled to the at least one processor and having instructions stored thereon, and when executed by the at least one processor, acting as:
   a verification job generation unit configured to generate a plurality of verification jobs all at once associated with identifiers for identifying a plurality of printing units and to cause a plurality of different printing units to print different identifiers on charts in a case where the charts are printed by the plurality of different printing units;
   a printing unit configured to print patches and the identifiers on the charts based on the verification jobs;
   a reading unit configured to read the identifiers and the charts; and
   a verification unit configured to verify a plurality of units that print the charts based on the identifiers and the charts read by the reading unit.

14. A verification job generation apparatus configured to:
   output a verification job to a printing apparatus so that the printing apparatus performs printing; and
   generate a plurality of verification jobs all at once for verifying a printing result of the printing apparatus based on the printing result of the printing apparatus and to cause a plurality of different printing units to print different identifiers on charts in a case where the charts are printed by the plurality of different printing units, wherein the verification job generation apparatus generates the verification job to which an identifier associated with the printing apparatus is included.

15. A verification apparatus configured to:

output a verification job to a printing apparatus so that the printing apparatus performs printing; and verify a printing result of the printing apparatus based on the printing result of the printing apparatus and to cause a plurality of different printing units to print different identifiers on charts in a case where the charts are printed by the plurality of different printing units, wherein the verification apparatus verifies the printing apparatus to which the verification job is output based on an identifier associated with the printing apparatus and included in the verification job.

16. A method of controlling an information processing system comprising at least one processor and at least a memory coupled to the at least one processor and having instructions stored thereon, and when executed by the at least one processor, acting as a verification job generation unit configured to generate a plurality of verification jobs all at once associated with an identifier for identifying a printing unit and to cause a plurality of different printing units to print different identifiers on charts in a case where the charts are printed by the plurality of different printing units, a printing unit configured to print a patch and the identifier on a chart based on the verification job, and a verification unit configured to verify printing by the printing unit that prints the chart based on the identifier and the chart read by the reading unit, the method comprising:

determining whether the chart is the chart corresponding to the verification job associated with the chart based on the identifier assigned to the chart, by the verification unit;

starting reading by the reading unit in a case where the chart is the chart corresponding to the verification job; and issuing an error notification using the identifier with the identifier as the error notification in a case where the chart is not the chart corresponding to the verification job.

* * * * *